Figure 1:
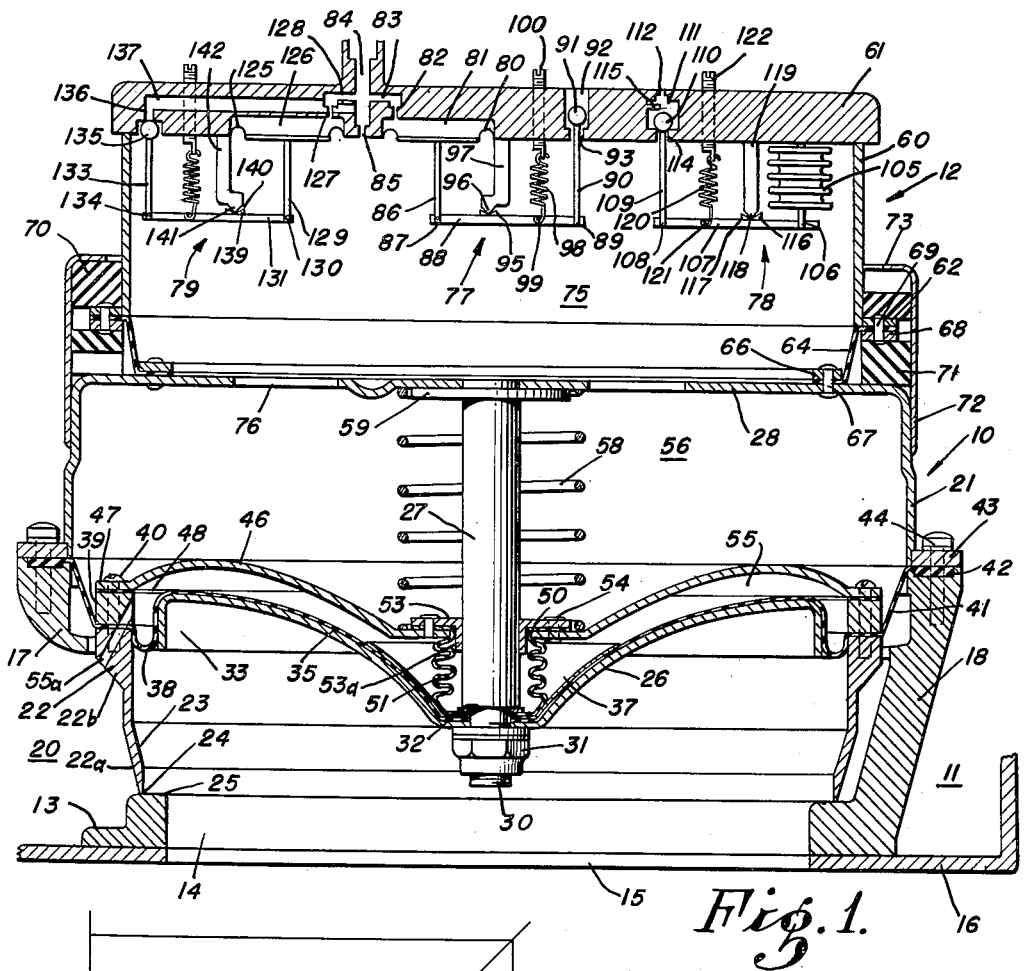

June 6, 1961  L. F. MAULDIN ET AL  2,986,989
PRESSURE REGULATING MECHANISM
Filed June 20, 1955  2 Sheets-Sheet 1

LLOYD F. MAULDIN
RICHARD C. NELSON
INVENTORS.

BY
Attorney

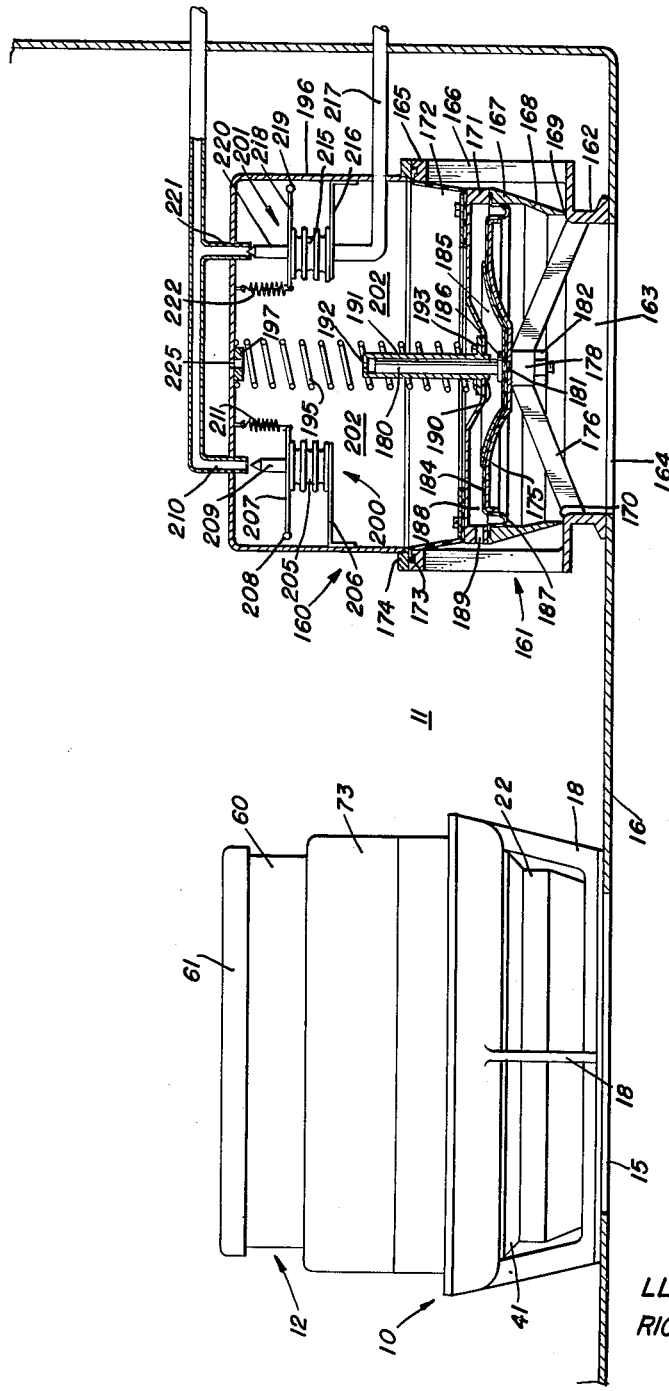

United States Patent Office 2,986,989
Patented June 6, 1961

2,986,989
PRESSURE REGULATING MECHANISM
Lloyd F. Mauldin and Richard C. Nelson, Los Angeles, Calif., assignors to The Garrett Corporation, Los Angeles, Calif., a corporation of California
Filed June 20, 1955, Ser. No. 516,726
10 Claims. (Cl. 98—1.5)

This invention relates generally to pressure control mechansims, and relates more particularly to mechanisms for controlling the pressure within an enclosure.

While the invention has particular utility in connection with pressurizing and ventilating systems for aircraft cabins and the like, and is shown and described herein as embodied in such a system, it is to be understood that its utility is not limited thereto.

In the pressurization of aircraft cabins for flight at altitudes above sea level it is customary to provide a blower or supercharger whereby air for ventilation purposes is taken from the ambient atmosphere, is compressed by the supercharger, and is then delivered to the cabin. In order to regulate the pressure of such ventilation air within the cabin, it is customary to provide a cabin pressure regulator which will maintain cabin pressure in accordance with a predetermined schedule.

For example, assume the aircraft is at a low altitude airport, approximately sea level, and then takes off. The outflow valves of the regulator are maintained open to permit escape from the cabin of air supplied thereto by the superchargers or the like so that cabin pressure follows atmospheric pressure and is of substantially the same value up to a predetermined altitude, say about 8,000 feet. Cabin pressure is slightly above atmospheric pressure throughout this range, that is, there is a slight differential of pressure between that in the cabin and ambient atmosphere, due to the spring provided for the outflow valve urging same in the closing direction. This spring is very light and is for the purpose of effecting closing of the outflow valve in case of failure of the mechanism controlling said valve.

Above 8,000 feet and up to a second predetermined altitude there is an isobaric control which maintains cabin pressure at substantially a constant value. Above the second predetermined altitude a differential control maintains the pressure in the cabin at a substantially constant fixed differential with respect to ambient atmosphere.

It has been found desirable in some types of installations to provide a regulator that may be preset to maintain definite differentials between cabin pressure and ambient atmospheric pressure in several ranges of operation.

It has further been found desirable to provide such a regulator that provides a differential control that may be preset to maintain a definite differential between cabin pressure and ambient atmospheric pressure in a primary differential range below the isobaric range and it is accordingly an object of the present invention to provide a regulator which will have this type of control as well as an isobaric control and a secondary differential control above the isobaric range.

In addition to the regulator, it is customary to install other valves such as safety relief valves which will provide escape of cabin air to atmosphere under certain conditions and will function in all ranges of operation to prevent cabin air from exceeding a predetermined differential with respect to ambient atmospheric air. However, while these other valves comprise valuable safety devices, they permit a large build up of pressure in the range below the isobaric range.

For example, when an aircraft starts on a flight with the supercharger or superchargers providing ventilating air to the cabin, should the principal regulator or regulators fail the outflow valve or valves thereof will close and because of the continuing supply of air from the supercharges there will be a build up of pressure in the cabin. This pressure build up will continue until the differential between the pressure in the cabin and ambient atmosphere has been reached for which the safety relief valves are set.

In some types of aircraft, as in jets, the build up of a large differential between cabin and ambient pressure may result in the blowing off of the canopy and as a consequence, the loss of the pilot out of the craft.

The present regulator is adapted to be used as a safety valve which, when installed along with a principal regulator, will prevent this build up of a large pressure differential between cabin and ambient atmosphere below the isobaric range, or for that matter, in other ranges.

It is another object of the invention to provide apparatus of this character that is relatively simple in construction and effective in operation.

The characteristics and advantages of the invention are further sufficiently referred to in connection with the following detailed description of the accompanying drawings, which represent one embodiment. After considering this example, skilled persons will understand that many variations may be made without departing from the principles disclosed, and we contemplate the employment of any structures, elements, or modes of operation that are properly within the scope of the appended claims.

Figure 2:
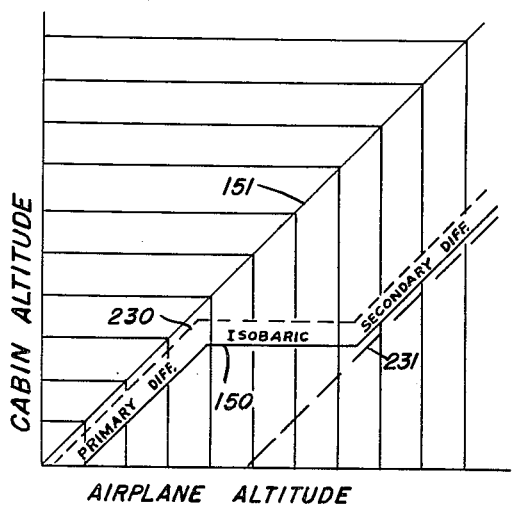

Referring to the drawings, which are for illustrative purposes only:

FIG. 1 is a diagrammatic or schematic view in section showing a regulating mechanism embodying the present invention;

FIG. 2 is a graph showing the flight schedule of the principal regulator system, the flight schedule of the present regulator, and the pressure curve of the usual safety relief valve system, all as related to ambient atmosphere; and FIG. 3 is a schematic view showing a principal regulator in section and as installed in an aircraft cabin, and a regulator embodying the present invention installed in said cabin as a safety valve in connection with the principal regulator.

Referring first to FIG. 1 there is shown an outflow valve, indicated generally at 10, for an enclosure or aircraft cabin 11, and a regulator mechanism, indicated generally at 12 for controlling said outflow valve. The valve and regulator mechanisms are shown here as a unitary assembly although the regulator may be located remotely from the outflow valve.

Outflow valve 10 includes a base 13 having an outflow opening 14 in register with an opening 15 in a wall 16 of the aircraft cabin. The base 13 is connected with a body portion 17 of the outflow valve by struts 18 which are annularly spaced apart to provide openings 20 for the flow of air as will be more particularly described hereinafter. Body portion 17 of the outflow valve is provided with a shallow inverted cup-shaped cover 21 secured to the body portion 17 by any suitable means such as screws, not shown.

There is an outflow valve member 22 for controlling the flow of air through the opening 14, said valve member being generally cylindrical but being provided with a frusto-conical portion having an inwardly tapering surface 23 and a relatively sharp edge 24 engageable with a valve seat 25. Disposed within the valve member 22 is a baffle 26 which is of smaller diameter than the inside diameter of the upper end of the valve member 22 within which said baffle is disposed. Means for supporting the baffle, which is axially arranged with respect to the valve member 22, comprises a bolt 27 having its upper end, as shown in FIG. 1, secured to the top wall 28 of said cover 21. The bolt 27 has a reduced diameter portion 30 which is externally threaded for reception for a nut 31. The baffle 26 is provided with a cental opening through which the reduced diameter portion 30 of the bolt is received and the nut 31 secures said baffle against a shoulder 32 at the junction of the body of the bolt and the reduced diameter portion 30.

At the outer peripheral edge the baffle has a downturned portion 33 and a flexible diaphragm 35 is adapted to normally rest on the top surface of said baffle. There is a central opening in the diaphragm 35 through which the reduced diameter portion 30 of the bolt 27 is received, and in order to secure a central area of said diaphragm and to prevent rupturing or tearing of same there is provided a retainer 37 which is also secured on the reduced diameter portion 30 of the bolt. The diaphragm 35 extends outwardly of the baffle in a convolution 38 and is clamped to the upper end of the valve 22 by means of a ring 39 secured by screws 40 to said valve member. A portion 41 of the diaphragm 35 extends outwardly of the valve member and is provided with an enlarged bead 42 received in a groove provided therefor in the upper end of the valve body 17. Bead 42 is clamped in the groove by means of a ring 43 secured by screws 44.

At the upper end of the valve member 22 the latter is provided with a cap 46 which is spaced upwardly of the baffle 26 and provided with the same general configuration as said baffle. A peripheral edge portion 47 of the cap 46 is disposed over the ring 39 and secured by the screws 40 to said ring and valve member 22, there being a gasket 48 between said baffle portion 47 and ring 39 to provide a seal therebetween. Portion 41 of the diaphragm 35 and the outflow valve assembly, particularly the cap 46, comprise a pressure responsive or sensitive control element.

Cap 46 has an axial opening 50 therein through which the bolt 27 extends, said opening 50 being larger than the diameter of the bolt 27, and the upper end of a boot 51 extends through said opening. The lower end of the boot is secured on the reduced diameter portion 30 of the bolt and the upper end extends over a central area of the cap 46 and is secured by a spring retainer 53 attached to the cap 46 by means of rivets 54. Boot 51 is of the corrugated type and is composed of any suitable well-known flexible material to provide a seal between chamber 55, located between the baffle 26 and cap 46, and an operating pressure chamber 56, defined by the cover 21 and cap 46. The spring retainer 53 is provided with a downturned flange 53a slidable on the bolt 27 which thereby serves as a guide for the movable valve member and its associated parts. A relatively light coil spring 58 is disposed about the bolt 47 for urging the cover and hence valve member 22 in the closing direction, said spring reacting between the central portion of the cap about the spring retainer 53 and the wall 28 of the cover. The upper end of spring 58 is held in position by a spring retainer 59 secured to the bolt 27.

Regulator 12 comprises a body portion 60 closed at its upper end by a head plate 61. The opposite end of the body 60 is secured to a ring 62 by any suitable means such as screws, not shown, said ring extending outwardly of said body at said opposite end. A flexible annular boot 64 provides a seal between the top wall 28 of the cover of the outflow valve and the body 60 of the regulating mechanism. The inner portion of boot 64 is secured to the wall 28 by a ring 66 held to said wall by rivets 67 or the like. A peripheral portion of the boot is clamped between the ring 62 and a ring 68, said rings being held together by means of rivets 69. Resilient shock absorbing means is provided between the regulating mechanism 12 and the outflow valve 10 and comprises resilient annular gaskets 70 and 71 disposed above and below the rings 62 and 68 respectively, the gasket 71 resting on the wall 20 of the outflow valve. A shield 72 is provided with an inturned upper edge portion 73 which engages the top of the gasket 70 and said shield is secured to the cover 21 by any suitable means, such as screws, not shown. Body 60 and head plate 61 define a control pressure chamber 75 which is connected with an operating pressure chamber 56 by means of openings 76 in the wall 28.

The pressure in chamber 75 is controlled by what will be termed a primary differential control 77 which controls said chamber pressure in the range up to isobaric range. To control the pressure in the isobaric range there is provided an isobaric control indicated generally at 78. Above the isobaric range there is a second differential range which will be termed the secondary differential range and the pressure in the control chamber is controlled in the latter range by a secondary differential control 79.

The primary differential control comprises a differential pressure responsive means or diaphragm 80 subjected on one side to pressure in the control pressure chamber 75. The opposite side of said diaphragm is subjected to the pressure in a chamber 81 which has a connection with ambient atmosphere through an orifice 82, passage 83 and passage 84, which in turn is connected with ambient atmosphere by any suitable conduit means, not shown. It is to be noted that the chamber 75 is connected with the passage 84 by means of a fixed restricted orifice or bleed 85. Diaphragm 80 is provided with a rod 86 pivotally connected at 87 to a lever 88. Adjacent its opposite end the lever 88 is pivotally connected at 89 to a valve stem 90 carrying a movable valve member 91 in a bore 92 which is connected to the cabin. Valve member 91 controls an orifice 93 between the passage 92 and the chamber 75. Intermediate its ends the lever 88 is provided with a notched member 95 in which is received a fixed pivot member 96, carried on a support 97 attached to the head plate 61. Means for varying the response of the primary differential control comprises a spring 98 having one end connected at 99 to the lever 88 between the pivotal point 96 and the pivotal point 89. The opposite end of spring 98 is operably connected to an adjustment screw 100 whereby the effective force of spring 98 on lever 88 may be varied.

The isobaric control 78 includes an evacuated bellows 105 having one end fixed to the head plate and the opposite end pivotally connected at 106 to a lever 107 adjacent one end of said lever. The opposite end of lever 107 has a pivotal connection 108 with a valve stem 109 which carries a movable valve member 110 located in a chamber 111. The chamber 111 has a restricted connection 112 with the cabin, and the valve member 110 controls an orifice 114 which connects chamber 111 with the control pressure chamber 75. In order to prevent the valve member 110 from closing the connection 112 a stop 115 is provided in chamber 111 which limits movement of valve member 110 toward said orifice 112. Lever 107 has a pivot member 116 intermediate the ends thereof, said member 116 having a notch 117 for reception of a pivotal member 118 at the end of a support 119, which is carried by the head plate 61. Between the pivotal member 116 and the pivot 108 one end of a spring 120 is connected to a pin 121. The opposite end of spring 120 is operably connected to an adjusting screw 122 whereby the effective force of spring 120 on the lever 107 may be varied.

The secondary differential control comprises a differential pressure responsive element or diaphragm 125 subjected on one side to the pressure in chamber 75. The opposite side of diaphragm 125 is subjected to the pressure in a chamber 126 connected by a restricted orifice 127 and a passage 128 with the passage 84 so that ambient atmospheric pressure will prevail in chamber 126. Diaphragm 125 carries a member 129 having a pivotal connection 130 with a lever 131. The connection 130 is adjacent one end of lever 131 and adjacent the opposite end of said lever a valve stem 133 has a pivotal connection 134. Valve stem 133 carries a movable member 135 which controls the flow of air through a passage 136 connected with a passage 137 which, in turn, is connected with the passage 84. The lever 131 is provided with a pivotal member 139 that is recessed at 140 for reception of a pivotal member 141 carried by a support 142 attached to the head plate 61.

Before describing in detail the operation of the regulator 12 a brief description of the operation of the outflow valve mechanism 10 will be made.

Air pressure within the operating chamber 56, together with the pressure of the spring 58 acting on the valve cap 46 urges the valve assembly in a direction tending to close the valve 22, the spring 58 normally maintaining said valve member 22 in the closed position.

The operating pressure in chamber 56 is substantially the same as the control pressure in the control pressure chamber 75 so that the outflow valve is controlled in accordance with said control pressure. Thus, the pressure in chambers 75 and 56 is effective on one side of the diaphragm 41 and the valve cap 46 to urge the valve member 22 in the closing direction. At the same time said valve member is urged in the opening direction by cabin pressure acting on the opposite side of diaphragm 41 and on the opposite side of said cap 46, said cabin pressure being present in the chamber 55 between said cap 46 and diaphragm 35 when the latter is in the normal position as shown in FIG. 1. This is due to the fact that cabin pressure is transmitted to the chamber 55 through a series of openings 55a in the upper portion of the valve member 22, in the ring 39 and that portion of the diaphragm clamped between said valve member and ring.

It will also be noted that the outer side 22a of the frusto-conical part of the valve member 22 is also exposed to cabin pressure urging the valve assembly in the valve opening direction, and there is an area 22b of said valve member against which cabin pressure is exerted, urging the valve assembly in the valve opening direction. The outer portion of the upper side of the convolution 38 of the diaphragm 35 is subjected to cabin pressure which prevails in chamber 55, urging the valve member in the closing direction.

As cabin pressure is higher than atmospheric pressure under normal conditions, the diaphragm 35 is pressed against the adjacent side of the baffle, as shown in FIG. 1. The baffle may be termed a wall and the diaphragm 35 may be considered a movable barrier which moves from the above-described position to a position whereat it engages the underside of the cap 46. This action occurs under various predetermined pressure conditions and a complete description thereof will be found in the patent to Jensen, No. 2,672,086, for a Safety Valve, said patent being issued March 16, 1954.

The outer side of the convoluted part 38 of the diaphragm 35 is exposed to atmospheric pressure, which is present in the pocket defined by the baffle 26 and valve member 22, said part spanning the space between the valve member 22 and the adjacent part of the baffle 26.

The pressure of the atmospheric air or fluid against the outer side of the convolution 38 exerts a force transferred by the outer portion of the convolution to the valve assembly or pressure responsive means and tends to move the same in a direction to open the valve. The frusto-conical portion 23 of the valve member 22, being of smaller diameter at its end nearest the valve seat 25, provides an area or shoulder on the inner side thereof against which atmospheric pressure in said pocket is exerted in a direction tending to close the valve. As these areas which are exposed to atmospheric pressure are substantially equal the valve assembly or pressure responsive means is balanced with respect to atmospheric pressure so that the valve will not be moved thereby toward open or closed position.

Referring to FIG. 2, the curve 150 shows the flight schedule which the present mechanism will maintain, and the function of this mechanism to maintain said flight schedule is as follows:

When the plane is operating below the isobaric range the valve 111 of the isobaric control 78 and the valve 135 of the secondary differential control 79 will be closed so that no air will flow past these valves. Valve 91 of the primary differential control 77 will be held off its seat by the force of spring 98 so that cabin air will flow past the valve 91 and into the control pressure chamber 75 through the orifice 93. The fixed bleed 85 provides a flow of air from the chamber 75 to atmosphere and as the area of the orifice 93 is substantially larger than the area of the orifice 85 the flow of cabin air into the control pressure chamber 77 through said orifice 93 will exceed the escape of air from chamber 75 so that the pressure in said chamber 75 will increase. When the differential of pressure between that in the control pressure chamber 75 and ambient atmosphere reaches the predetermined setting of the primary differential diaphragm 80 the differential pressure acting across said diaphragm 80 will cause the valve 91 to move in the closing direction where it will regulate the flow of air from the cabin into the control pressure chamber 75 to maintain said preset differential. Thus, throughout the primary differential range, a predetermined differential will be maintained between the pressure in the cabin and ambient atmosphere, the ambient atmospheric curve being indicated at 151 on the chart of FIG. 2.

As the plane continues to gain altitude in the primary differential range there is a continuing decrease of pressure in the control pressure chamber and as the isobaric level is approached the pressure in said chamber has dropped sufficiently to cause the evacuated bellows 105 of the isobaric control 78 to expand and move the valve 110 in the open direction for the regulation of air flow from the cabin through the orifice 112. This orifice provides a set bleed which is larger than the orifice 85. Pressure bled into the chamber 75 through the orifice 112 is so controlled by the isobaric bellows 105 as to maintain a pressure in the chamber 75 at a substantially constant level throughout the isobaric range. At this time the differential between the pressure in the control chamber 75 and the pressure of the ambient atmosphere exceeds the predetermined setting of the primary differential diaphragm 80 so that the valve 91 is moved, and held in, the closed position.

When the upper limit of the isobaric range is reached the differential pressure between that in the control chamber 75 and the pressure of the ambient atmosphere reaches the predetermined setting of the secondary differential control and this differential, acting on the diaphragm 125 causes the valve 135 to move in the opening direction and regulate the discharge of air from the chamber 75 to atmosphere through the passages 136, 137 and 84. During this stage of operation the valve 110 will come to rest against the stop 115 and remain in the fully open position so that at all times a constant flow of cabin air into the chamber 75 will occur through the orifice 112 and the pressure in the control pressure chamber will be maintained at the preset constant differential by control effected by the secondary differential mechanism 79.

It is to be noted that in the primary differential range there is a modulated inflow of air into chamber 75 from a region of higher pressure, such as a cabin, and a fixed outflow from said chamber to a region of lower pressure, as ambient atmosphere. In the isobaric range there is also a modulated inflow of air into chamber 75 and a fixed outflow from said chamber to ambient atmosphere. In the secondary differential range there is a fixed inflow of air into chamber 75 with a combined fixed and modulated outflow.

In FIG. 3 there is shown a principal regulator, indicated generally at 160, which includes an outflow valve, indicated generally at 161, and having regulating means within the control pressure chamber thereof, which will be more particularly described hereinafter.

The outflow valve mechanism 161 is of similar character to the outflow valve 10, which has already been described. However, a brief description of outflow valve 161 will be given here. There is a base 162 having opening 163 which is in register with an opening 164 in the cabin wall 16. There is also a body portion 165 which is connected to the base 162 by means of struts 166 spaced annularly apart. There is a movable outflow valve member 167 which is generally cylindrical in shape, but includes a frusto-conical portion 168 terminating in a relatively sharp edge 169 engageable with an outflow valve seat 170. Valve member 167 is provided with a cover 171 which closes the upper end thereof and to which an annular flexible diaphragm 172 is secured. Diaphragm 172 has a peripheral bead 173 received in a groove provided therefor in the body 165 and said bead is secured in said groove by means of an annular ring 174 attached to the body 165 by any suitable means, not shown.

Within the valve member 167 is a baffle 175 supported by a spider 176 which is attached to the base 162. The arms of the spider 176 are inclined upwardly and joined at a hub 178 having an opening therethrough which is on the axis of said valve member 167. There is a rod 180 arranged axially of said hub 178 and said rod is provided with a reduced externally threaded end portion 181 which extends through an axial opening provided in said baffle 175 and through the opening in said hub, there being a nut 182 on said reduced diameter portion for securing the rod in position.

Disposed on the baffle is a flexible diaphragm or sealing means 184 which has a central opening for reception of the reduced diameter portion 181, and securing a central area of said diaphragm 184 is a retainer plate 185 which also has a central opening for reception of said reduced diameter portion 181. A flange 186 on said rod 180 engages the upper surface of said retainer 185 so that the various parts on said reduced diameter portion 181 are clamped between said flange and said nut 182. Diaphragm 184 has a convoluted portion 187 adjacent the periphery thereof and a peripheral portion of said diaphragm is clamped between said valve member 167 and cover 171. The chamber 188 between the diaphragm 184, when disposed on said baffle 175, is connected with the cabin by means of a series of ports 189 in the cover 171 so that cabin pressure prevails in said chamber 188.

Cover 171 is provided with an axial opening for reception of the free end 190 of a sleeve 191 slidable on the rod 180, there being a pressure relief port 192 in the closed end of said sleeve. Sleeve 191 is provided with a flange 193, which rests on the upper surface of the cover 171 whereby said sleeve may be attached to said cover by screws, rivets, or other suitable means, not shown. A relatively light spring 195 reacts between the upper wall of the cover 171 and the end wall of the cap 196, which is secured to the body of the outflow valve mechanism. The spring 195 has its outer end held against displacement by a spring retainer 197 while the opposite end is disposed about the sleeve 191.

The operation of the outflow valve of the principal regulator is substantially the same as the outflow valve 10 described above, and control of the outflow valve is effected by an isobaric control means, indicated generally at 200, and a differential pressure control means indicated generally at 201. The control means 200 and 201 are both located within a control pressure chamber 202 defined by a generally cup-shaped cap 196, the diaphragm 172 and the cover 171 of the outflow valve member.

The isobaric control 200 comprises an evacuated bellows 205 having one end fixed to a bracket 206 attached to a wall of the cap 196. The opposite end of the bellows 205 is movable and is attached to a lever 207 which is pivoted at 208 and carries a movable valve member or metering pin 209 adapted to control the flow of air from the chamber 202 by way of a conduit 210 leading to a low pressure region such as ambient atmosphere. The free end of lever 207 is urged in a direction to effect closing movement of the metering pin 209 by a spring 211, which has one end attached to the free end of said lever and the opposite end attached to the wall of the cap 196.

The differential control mechanism comprises a differential bellows 215 having one end secured to a bracket 216 attached to a wall of the cap 196. The interior of bellows 215 is connected to ambient atmosphere by means of a conduit 217 while the exterior of said bellows is subjected to the pressure in the control chamber 202. The opposite end of bellows 215 is secured to a lever 218 having one end pivoted at 219, said lever having a movable valve member or metering pin 220 secured thereto for controlling the outflow of air through a conduit 221 connected with the conduit 210. A spring 222 has one end connected to the free end of lever 218 and the other end connected to a wall of the cap 196, said spring urging the lever in a direction to effect closing movement of the valve member 220. It is to be noted that the isobaric control 200 and the differential control 201 control the escape of air from the control pressure chamber 202. Air is admitted to said chamber by means of a bleed 225 from a region of higher pressure which is shown as the aircraft cabin.

The isobaric control 200 and differential control 201 of the principal regulator 160 function to control the pressure in chamber 202, and hence on the cabin in accordance with the pressure schedule shown by the curve 230. While these controls function substantially in the manner described in the Kemper Patent No. 2,463,491 for a Cabin Pressure Regulator, issued March 1, 1949, a brief description of the operation of these controls will be given here.

In the primary differential range, the range below the isobaric range, the pressure in the chamber 202, and hence in the cabin will be substantially the same as ambient atmospheric pressure except that there will be a slight differential between chamber and cabin pressure and ambient atmospheric pressure, due to the action of the light spring 195 which will cause cabin pressure to be maintained slightly above atmospheric pressure. In the isobaric range pressure in the chamber 202, and hence in the cabin, will be maintained at substantially a constant value. In the secondary differential range, which is the range above the isobaric range, the pressure in chamber 202 and in the cabin will be maintained by the differential control 201 at a substantially fixed differential pressure with respect to ambient atmospheric pressure. It will be noted from the graph of FIG. 2 that the regulator 12, when used as a safety mechanism in connection with a principal regulator system, is set for a somewhat higher pressure schedule as is clearly brought out by comparing the pressure curve 150 of the regulator 12 with the pressure curve 230 of the principal regulator, although it should also be noted that these curves are parallel to each other.

The dotted line 231 represents the pressure curve of the usual pressure relief or safety valve and with this type of safety valve a failure of the principal regulator below the isobaric range or in the isobaric range would result in a rapid pressure increase in the cabin because the supercharger continually supplies air under pressure to the cabin, there being no relief of the pressure in said ranges until the pressure has increased to a value for which the pressure relief valve has been set. However, with the use of the present mechanism having the control arrangement of the regulator 12 failure of the principal regulator in the primary differential range will result in but a small increase in cabin pressure as clearly shown by the comparison of the curve 230 with the curve 150 in the primary differential range. From the curves of 150 and 230 of FIG. 2 it will be apparent that upon failure of the principal regulator the present mechanism having the arrangement of the regulator 12 will take over control of cabin pressure with but a comparatively slight change of pressure as compared with the pressure schedule of said principal regulator.

We claim:

1. In mechanism for controlling the pressure in an enclosure: walls defining a control pressure chamber; a movable pressure sensitive element subjected to control pressure on one side and adapted to be subjected to enclosure pressure on the other side; means for controlling the pressure in said chamber in a primary differential range of operation extending up to a predetermined altitude, including differential pressure responsive means responsive to the differential of pressure between that in said chamber and ambient atmospheric pressure; means for controlling the pressure in said chamber in an isobaric range of operation from said predetermined altitude to a second predetermined altitude, said means including an absolute pressure responsive device subjected to control chamber pressure; and means for controlling the pressure in said chamber in a second differential range of operation extending from said second predetermined altitude, said means including a second differential pressure responsive means responsive to the differential of pressure between that in the control chamber and ambient atmosphere.

2. In mechanism for controlling the pressure in an enclosure: walls defining a control pressure chamber; pressure sensitive control means subjected to control pressure on one side and adapted to be subjected to enclosure pressure on the other side, said means including a pressure sensitive element and a valve for controlling the outflow of air in said enclosure; means for controlling the pressure in said chamber in a primary differential range of operation below a predetermined altitude, including differential pressure responsive means responsive to the differential pressure between that in said chamber and ambient atmospheric pressure; means for controlling the pressure in said chamber in an isobaric range of operation extending up to a second predetermined altitude, including an absolute pressure responsive device subjected to control chamber pressure; and means controlling the pressure in said chamber in a secondary differential range of operation extending upwardly from said second predetermined altitudes, including a second differential pressure responsive means responsive to the differential of pressure between that in the control chamber and ambient atmosphere.

3. In mechanism for controlling the pressure in an enclosure: walls defining a pressure chamber; a movable pressure sensitive control element subjected on one side to the pressure of said chamber and adapted to be subjected to enclosure pressure on its other side; a pair of inlet means for said chamber, one of said inlet means including an orifice of fixed size; a pair of outlet passages for said chamber, one of said outlet passages being controlled by a valve member, the other of said outlet passages including an orifice of fixed size; a valve controlling each of said inlet means; differential pressure responsive means responsive to the differential of pressure between that in said chamber and external pressure for controlling one of said valves; absolute pressure responsive means controlling the other of said valves; said absolute pressure responsive means being responsive to the pressure of said chamber; and second differential pressure responsive means, responsive to the differential of pressure between that in the control chamber and external pressure for controlling the valve member of said one outlet passage.

4. The invention defined by claim 3 wherein one of said differential pressure responsive means has different response characteristics from those of the other differential pressure responsive means.

5. In mechanism for controlling the pressure in an enclosure: walls defining a control pressure chamber; a movable pressure sensitive control element subjected on one side to the pressure of said chamber and adapted to be subjected to enclosure pressure on the other side; and means for controlling the pressure in said control pressure chamber including an isobaric control means responsive to the pressure in said chamber and operable to maintain the pressure at a substantially constant value; differential pressure control means including a differential pressure responsive device responsive to the differential of pressure between that in said chamber and ambient atmospheric pressure and adapted to maintain pressure in said chamber at a predetermined substantially fixed differential pressure with respect to ambient atmospheric pressure in a primary differential range below the isobaric range; and a second differential pressure control means including a differential pressure responsive device responsive to the differential of pressure between that in said chamber and ambient atmospheric pressure and adapted to maintain the pressure in said chamber at a substantially fixed differential with respect to ambient atmosphere in a secondary differential range above said isobaric range.

6. In mechanism for controlling the pressure in an enclosure: walls defining a control pressure chamber; a movable pressure sensitive control element subjected on one side to the pressure of said chamber and adapted to be subjected to enclosure pressure on its other side; a pair of inlet means for said chamber, one of said inlet means including an orifice of fixed size; a valve controlling each of said inlet means; a pair of outlet passages for said chamber, one of said outlet passages being controlled by a valve member, the other of said outlet passages including an orifice of fixed size, said orifice being of smaller effective size than the first mentioned fixed orifice; absolute pressure responsive means controlling the valve of the inlet means having the orifice of fixed size; differential pressure responsive means responsive to the differential of pressure between that in said chamber and external pressure for controlling the valve of the other inlet means; and second differential pressure responsive means, responsive to the differential of pressure between that in the control chamber and external pressure for controlling the valve member of said one outlet passage.

7. In mechanism for controlling the pressure in an enclosure: walls defining a control pressure chamber having inflow passage means including an orifice of fixed size and outflow passage means including an orifice of fixed size; means for controlling the pressure in said chamber including a plurality of pressure responsive means, one of said pressure responsive means being responsive to the differential between pressure in said chamber and ambient atmospheric pressure and being adapted to provide a modulating inflow into said chamber through said inflow passage means in connection with the fixed outflow through said outflow passage means in a primary differential range; another of said pressure responsive means being responsive to pressure in said chamber and providing a modulating inflow to said chamber through said inflow passage means in connection with a fixed outflow through said outflow passage means for maintaining the pressure in said chamber at a substantially constant level in an isobaric range above the primary differential range; and another of said pressure responsive means being responsive to the differential between pressure in said chamber and ambient atmospheric pressure and controlling the pressure in said chamber in a secondary differential range above said isobaric range by modulating an outflow through said outflow passage means in connection with a fixed inflow through said inflow passage means and a fixed outflow through said outflow passage means.

8. In mechanism for controlling the pressure in an enclosure: walls defining a control pressure chamber; inflow and outflow passage means for said chamber; means for controlling the pressure in said chamber including a plurality of pressure responsive means, one of said pressure responsive means being responsive to the differential in pressure between that in said chamber and ambient atmospheric pressure and adapted to provide a modulated inflow into said chamber through said inflow passage means in connection with a fixed outflow through said outflow passage means in a predetermined differential range; and another of said pressure responsive means being responsive to the differential in pressure between that in said chamber and ambient atmospheric pressure and adapted to control the pressure in said chamber in another predetermined differential range by providing a modulated outflow through said outflow passage means in connection with a fixed inflow through said inflow passage means and a fixed outflow through said outflow passage means.

9. In mechanism for controlling the pressure in an enclosure: walls defining a control pressure chamber; means for controlling the pressure in said chamber in a primary differential range of operation up to a predetermined altitude, said means including differential pressure responsive means responsive to the differential of pressure between that in said chamber and ambient atmospheric pressure; and means for controlling the pressure in said chamber in another range of operation above said predetermined altitude, including an absolute pressure responsive device subjected to control chamber pressure.

10. The invention defined by claim 9 including means for controlling the pressure in said control pressure chamber in a third range of operation above that wherein the absolute pressure responsive device controls said chamber pressure, including a second differential pressure responsive means responsive to the differential of pressure between that in the control chamber and ambient atmosphere.

References Cited in the file of this patent

UNITED STATES PATENTS

| | | |
|---|---|---|
| 2,578,026 | Taylor | Dec. 11, 1951 |
| 2,620,719 | Price | Dec. 9, 1952 |
| 2,692,545 | Arthur et al. | Oct. 26, 1954 |
| 2,696,153 | Kemper | Dec. 7, 1954 |
| 2,734,442 | Jensen | Feb. 14, 1956 |
| 2,814,241 | Silver | Nov. 26, 1957 |